United States Patent [19]

[11] 3,790,821

[45] Feb. 5, 1974

Adamson

[54] CIRCUIT FOR SUPPRESSION OF SPURIOUS PULSES RESULTING FROM RELAY OPERATION

[75] Inventor: Gerald P. Adamson, Houston, Tex.

[73] Assignee: Dresser Industries, Inc., Dallas, Tex.

[22] Filed: Aug. 21, 1972

[21] Appl. No.: 282,884

[52] U.S. Cl. .............. 307/247 A, 307/265, 307/273, 307/268, 340/365 E

[51] Int. Cl. .......................... H03k 3/286, H03k 5/00

[58] Field of Search 307/247 A, 265, 266, 268, 273; 340/365 E; 178/17 R, 17 A, 17 GD, 81

[56] References Cited

UNITED STATES PATENTS

| | | | |
|---|---|---|---|
| 3,471,789 | 10/1969 | Nutting et al. | 307/247 A |
| 3,593,036 | 7/1971 | Ma et al. | 307/247 A |

*Primary Examiner*—John Zazworsky
*Attorney, Agent, or Firm*—William E. Johnson, Jr.

[57] ABSTRACT

Pulses are generated by connecting the closure of a reed relay switch across a charged capacitor in an RC network. The pulses are then inverted and coupled into the "CLOCK" input of a "D" type flip-flop circuit.

11 Claims, 3 Drawing Figures

CIRCUIT FOR SUPPRESSION OF SPURIOUS PULSES RESULTING FROM RELAY OPERATION

Figure 1:
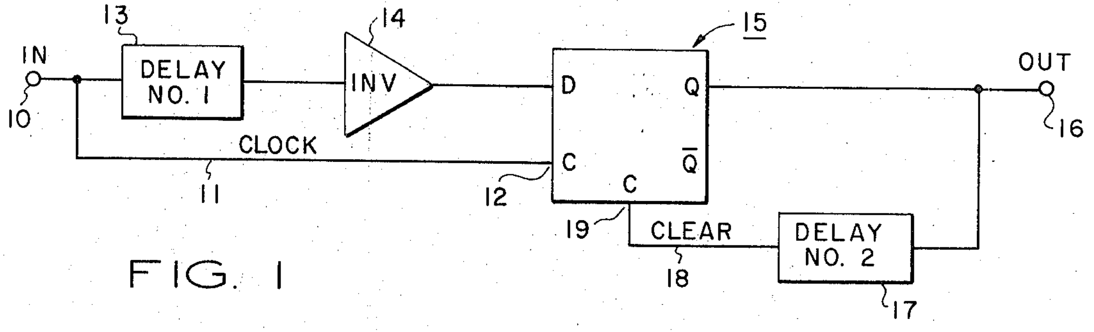

The inverted pulses are also coupled through a first delay circuit having a given RC time constant into a second inverter, the output of which is connected to the "D" input of the flip-flop circuit. A second delay circuit is connected between the "Q" output of the flip-flop and the "CLEAR" input of the flip-flop circuit. The output for the circuit is taken from the "Q" output terminal of the flip-flop. The first inverter cleans up the switch closure pulse and inverts it for the clock pulse. Prior to the closure of the switch, the input to the first inverter is high and its output low. In a similar manner, the input to the second inverter is low and its output high. Thus, prior to the closure of the switch, the "D" input of the flip-flop circuit is in the logical high state. Since "D" type flip-flop circuits store the information on the "D" input at the instant of clocking, the instant that the reed switch is closed, the output of the first inverter goes high and thus clocks the high "D" input. The "D" input then goes from the high logic level to the low logic level at the end of the duration of the delay circuit number 1 and no further pulses can be clocked out of the flip-flop until the relay switch is opened plus the duration of delay circuit number 1. Once the "D" input has been clocked out of the flip-flop circuit, the flip-flop cannot be clocked again until the flip-flop has been cleared. Because of the delay circuit number 2 between the "Q" output and the "CLEAR" input, there is a built-in time when no additional pulses can be generated from the flip-flop circuit. Therefore, the overall circuit configuration yields suppression of such spurious pulses for the duration width of the reed switch closure plus the time of the first delay circuit.

BACKGROUND OF THE INVENTION

This invention relates generally to spurious pulse suppression, and in particular, to the suppression of spurious pulses resulting from the opening and closing of relay switches.

As is well known in the art, the operation of a reed relay quite often produces a bounce and "chatter" of the relay contacts which creates spurious pulses and false information.

It is therefore the primary object of the present invention to provide a circuit for suppressing such spurious electrical pulses as are associated with the operation of electrical relays; and It is yet another object of the present invention to provide a circuitry for generating distinct electrical pulses in response to the closure of relay contacts and which is unaffected by spurious pulses generated by such contacts.

SUMMARY OF THE INVENTION

The objects of the invention are accomplished, generally, by the provision of a circuit which utilizes at least one inverter circuit and a pair of delay circuits in combination with a D-type flip-flop circuit to produce a single electrical pulse for each closure of a relay contact and which suppresses spuriously generated electrical pulses associated with such closure.

Figure 2:
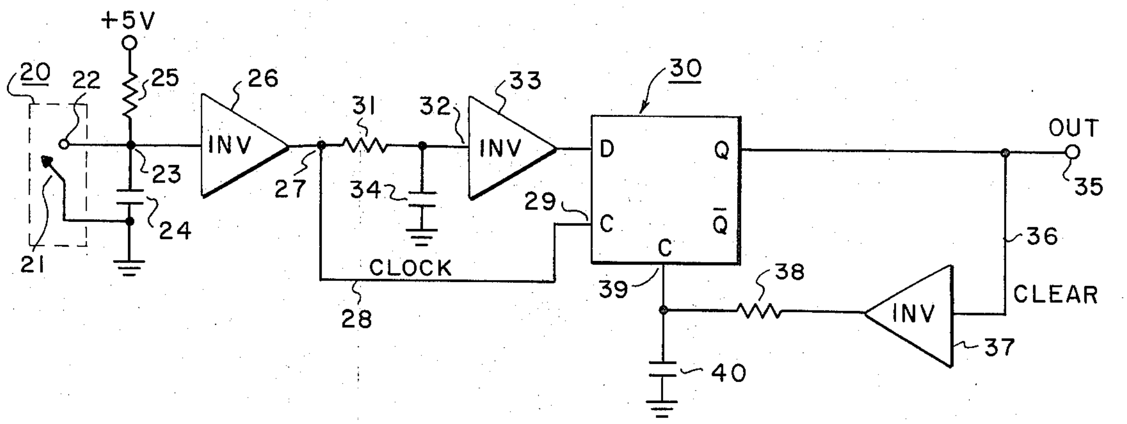
Figure 3:
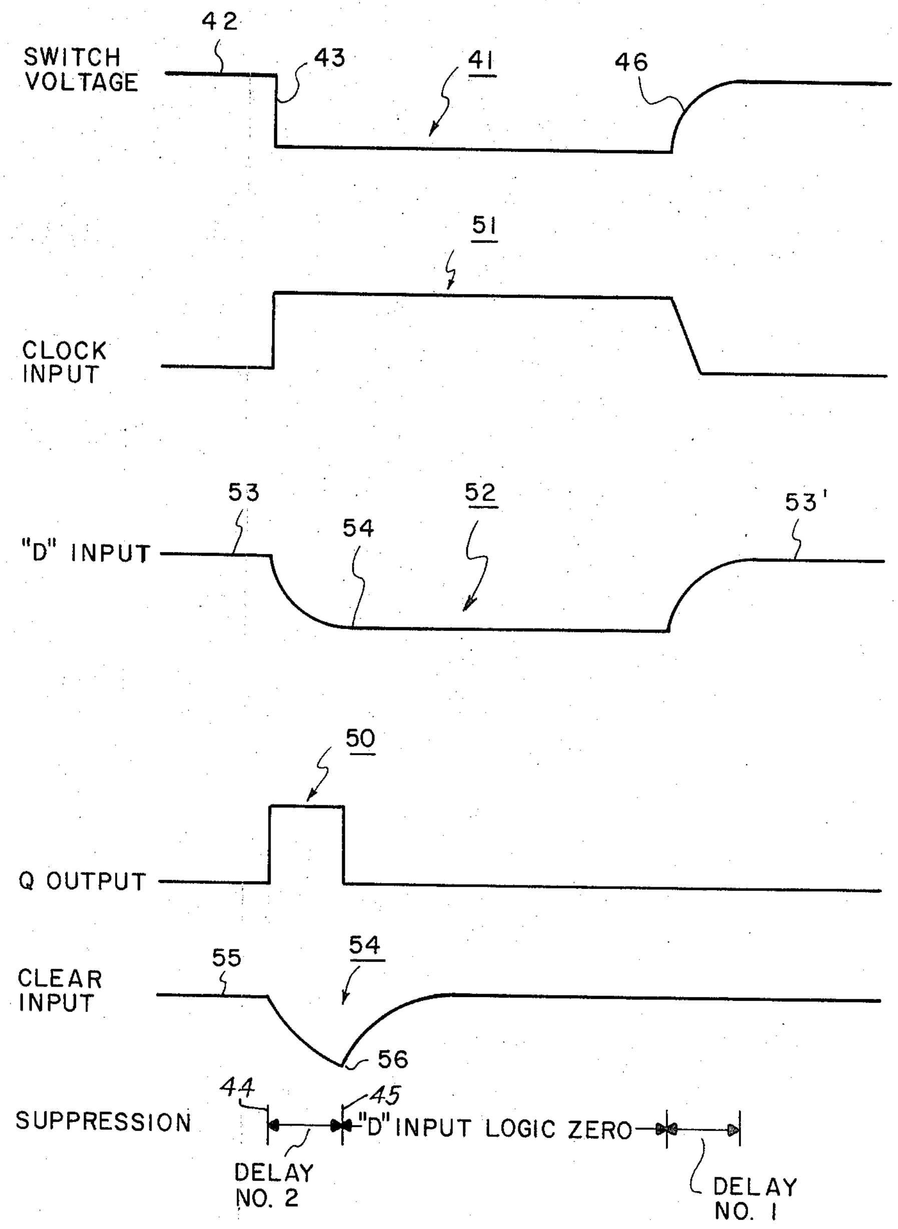

These and other objects, features and advantages of the present invention will be more readily understood from a reading of the following detailed specification, and drawing, in which:

FIG. 1 is a block diagram of the pulse generation and suppression circuitry according to the present invention;

FIG. 2 is a schematic illustration of the pulse generation and suppression circuitry according to the present invention; and FIG. 3 illustrates graphically a characteristic pulse generated by the closing of a relay contact, the various waveforms found in the circuitry of the invention and the extent of spurious pulse suppression provided by the first and second delay circuits illustrated in FIG.'s 1 and 2.

Referring now to the drawing in more detail, especially to FIG. 1, there is illustrated an input terminal 10 which is connected to a delay circuit 13 bearing the legend "Delay No. 1." The output of the delay circuit 13 is connected to an inverter circuit 14, the output of which is connected to the "D" input of a "D" type flip-flop circuit 15. It should be appreciated that "D" type flip-flop circuits are conventional, for example, as discussed on pages 11 and 12 of The Digital Logic Handbook, published in 1970 by the Digital Equipment Corporation, Maynard, Massachusetts. The input terminal 10 is also connected by the conductor 11, bearing the legend "CLOCK," to the input terminal 12 of the flip-flop circuit 15 bearing the legend "C." The "Q" output of the flip-flop circuit 15 is connected to an output terminal 16 which is also connected through a delay circuit 17 bearing the legend "Delay No. 2." The output of the delay circuit 17 is connected by the conductor 18 bearing the legend "CLEAR" to the input terminal 19, bearing the legend "C", of the flip-flop circuit 15.

In the operation of the circuit of FIG. 1, it should be appreciated that when an electrical pulse, for example a positive-going one, is applied to the input terminal 10, it is also applied to the clock input terminal 12 of the flip-flop 15. Prior to the application of the pulse to the input terminal 10, the input to the inverter 14 is in the "low" state and its output is in the "high" state. When the positive-going signal is applied to the input terminal 10, the Delay Circuit No. 1 allows the "high" state appearing at terminal "D" on the flip-flop 15 to be clocked out before the signal appearing at input terminal 10 has had time to change the state appearing at the output of the inverter 14. When the "high" state appearing at terminal "D" has been clocked out, the output appearing at the "Q" output of flip-flop circuit 15 is coupled back through the Delay Circuit No. 2 to the "CLEAR" input of flip-flop circuit 15. Since the flip-flop circuit 15 cannot generate an additional pulse until it has been cleared, there thus results a suppression of spuriously generated pulses during the delay time of the Delay Circuit No. 2. Furthermore, as will be illustrated in greater detail with respect to FIG. 2, the action of the Delay Circuit No. 1 is active to suppress additional spuriously generated electrical pulses when the pulse is being removed from the input to terminal 10.

Referring now to FIG. 2, a reed delay 20 is illustrated as having a closure arm 21 and a normally open contact 22. The arm 21 is connected to ground and the contact 22 is connected to junction 23. A capacitor 24 is connected between junction 23 and ground. The junction 23 is also connected by means of resistor 25 to a +5 volts DC. The junction 23 is also connected to the input of a conventional inverter circuit 26 whose output is connected to junction 27 which in turn is connected by the electrical conductor 28, bearing the legend "CLOCK," to the input terminal 29 of a conventional "D" type flip-flop circuit 30. The junction 27 is also connected by means of resistor 31 to input terminal 32 on the inverter circuit 33, the input terminal 32 also being connected through a capacitor 34 to ground. The output of the inverter circuit 33 is connected to the "D" input of the flip-flop circuit 30. The "Q" output terminal of the flip-flop circuit 30 is connected to the output junction 35 which in turn is connected by conductor 36, bearing the legend "CLEAR," to the input of inverter circuit 37. The output of the inverter circuit 37 is connected by resistor 38 to the input terminal 39 of the flip-flop circuit 30, bearing the legend "C." The input terminal 39 is also connected by means of capacitor 40 to ground.

In the operation of the circuit of FIG. 2, it should be appreciated that without the closure of the reed switch 20, the junction 23 is charged up to the + 5 volts applied at the top of resistor 25 in a manner as determined by the RC time constant of the resistor 25 and the capacitor 24. Thus, prior to the closure of the switch 20, the junction 23 is at a "high" state. Because of the nature of the inverter circuit 26, the junction 27 is thus at a "low" state and the input to the inverter 33 is at the "low" state. In turn, the output of the inverter 33 is in the "high" state. To summarize at this point, when the junction 23 is at the "high" state prior to the closure of the switch 20, the voltage appearing on the "D" input of the flip-flop circuit 30 is also in the "high" state. When the switch 20 is closed, the junction 23 immediately goes from the "high" state to the "low" state because of the grounding thereof. This can best be understood by reference to the graphic illustration in FIG. 3 wherein the waveform 41 is indicative of the voltage appearing at the junction 23. The portion 42 of the waveform 41 is indicative of the junction 23 immediately prior to the closure of the switch. The portion 43 of the curve is indicative of the switch 20 being closed and it is seen that the voltage goes from the "high" state to the "low" state upon the closing of the switch. Upon closure of the switch, since the input to the inverter 26 is in the "low" state, the output of the inverter 26, appearing at junction 27, immediately goes to the "high" state and thus applies a high voltage to the clock input 29 of the flip-flop circuit 30. Thus, the "high" state appearing on "D" input terminal of flip-flop 30 is immediately clocked out of the "Q" output terminal of flip-flop 30 and appears on the output terminal 35. This waveform 50 is graphically illustrated in FIG. 3.

Referring further to FIG. 3, the clock input pulse waveform 51 is illustrated as being a "cleaned-up," inverted version of the waveform 41. The "D" input waveform 52 is illustrated as having a "high" state 53 which then goes to a "low" state 54, but in a delayed manner as controlled by the Delay Circuit No. 1. The waveform 52 then returns to the "high" state 53', also in a delayed manner controlled by Delay Circuit No. 1. The "CLEAR" input waveform 54 goes from an initial "high" state 55 in a delayed manner controlled by Delay Circuit No. 2 to the point 56 which is of adequate magnitude to clear the flip-flop 30 and thus terminate the "Q" output pulse 50. Following the termination of pulse 50, the "CLEAR" input pulse 54 then returns in a delayed manner to its "high" state.

When the switch 20 starts to open, the capacitor 24 will again begin to charge and the voltage appearing at junction 23 will begin going towards the "high" state in the exponential manner illustrated in FIG. 3, specifically being the curved portion 46 of the waveform 41. During this time of opening the switch 20, the circuit is especially susceptible to spurious pulses being generated because of relay bounce or clatter but the action of the Delay Circuit No. 1, being the resistor 31 and capacitor 34, enables the circuit to suppress such spurious pulses during this time since the "D" input curve does not return to its "high" state 53' until the end of delay number 1. The Delay Circuit No. 1 can also be set for various lengths of time, depending upon the RC time constant of the resistor 31 and the capacitor 34 as well as the current capability of the inverter 26. In the practice of the invention, it has generally been found desirable to make the delay time for the Delay Circuit No. 2, being measured between lines 44 and 45, equal to or slightly longer than the delay time of the Delay Circuit No. 1. Unless the delay number 2 is substantially as long as the delay number 1, there is a chance that the flip-flop could be cleared before the "D" input has had time to go from the "high" state to the "low" state which could then admit to the possibility of a spurious pulse being clocked out.

Thus, it should be appreciated by those skilled in the art that while the preferred embodiment of the present invention has been illustrated and described herein in detail, obvious modifications will be apparent from a careful reading of the foregoing detailed specification and drawing. For example, while the specific delay circuits have been illustrated and described as being a function of an RC time constant, those skilled in the art will recognize that other delay lines or circuits can be used as are known in the art. Furthermore, aside from using the circuits illustrated and described herein for suppression of spurious pulses associated with the opening and closing of relay contacts or switches, the circuitry can also be used for the suppression of other types of spurious electrical pulses, for example, those associated with "NOISE" or other such externally generated pulses.

The embodiments of the invention in which an exclusive property or privilege is claimed are defined as follows:

1. A circuit for suppressing spurious electrical pulses associated with the generation of a valid electrical pulse, comprising:

an input terminal for receiving said valid pulse;

a "D" type flip-flop circuit having a "D" input, a clock input, a clearing input and an output, said input terminal being connected to said clock input;

an inverter having an input and an output, the output of said inverter being connected to said "D" input;

first delay means connected between said input terminal and the input of said inverter; and second delay means connected between said output of said flip-flop circuit and said clearing input.

2. The circuit according to claim 1 wherein said output of said flip-flop is non-inverting and being further characterized as including a second inverter in series with said second delay means between said output of said flip-flop and said clearing input.

3. The circuit according to claim 1 wherein said second delay means is of a time duration substantially at least as long as that of said first delay means.

4. A circuit for generating a valid pulse and to suppress spurious electrical pulses associated therewith, comprising:

a first capacitor;

means to charge said capacitor;

switching means connected across said capacitor for discharging said capacitor;

a first junction connected to one side of said capacitor, the voltage appearing thereon being indicative of the charged state of said capacitor;

a first inverter having an input and an output, said first inverter input being connected to said first junction;

a second junction being connected to the output of said first inverter;

a "D" type flip-flop circuit having a "D" input, a clock input, a clearing input and an output, said second junction being connected to said clock input;

a second inverter having an input and an output, the output of said second inverter being connected to said "D" input;

first delay means connected between said second junction and the input of said second inverter; and second delay means connected between said output of said flip-flop and said clearing input.

5. The circuit according to claim 4 wherein said output of said flip-flop is non-inverting and being further characterized as including a third inverter in series with said second delay means between said output of said flip-flop and said clearing input.

6. The circuit according to claim 4 wherein said second delay means is of a time duration substantially at least as long as that of said first delay means.

7. A circuit for suppressing spurious electrical pulses associated with the generation of a valid electrical pulse, comprising:

an input terminal for receiving said valid pulse;

a "D" type flip-flop circuit having a "D" input, a clock input, a clearing input and an output, said input terminal being connected to said clock input;

an inverter having an input and an output, the output of said inverter being connected to said "D" input; and delay means connected between said input terminal and the input of said inverter.

8. The circuit according to claim 7 wherein said output of said flip-flop is non-inverting and being further characterized as including a second inverter connected between said output of said flip-flop and said clearing input.

9. A circuit for generating a valid electrical pulse and to suppress spurious electrical pulses associated therewith, comprising:

electrical pulse generating means;

a first junction connected to said generating means;

a first inverter having an input and an output, said first inverter input being connected to said first junction;

a second junction being connected to the output of said first inverter;

a "D" type flip-flop circuit having a "D" input, a clock input, a clearing input and an output, said second junction being connected to said clock input;

a second inverter having an input and an output, the output of said second inverter being connected to said "D" input;

first delay means connected between said second junction and the input of said second inverter; and second delay means connected between said output of said flip-flop and said clearing input.

10. The circuit according to claim 9 wherein said output of said flip-flop is non-inverting and being further characterized as including a third inverter in series with said second delay means between said output of said flip-flop and said clearing input.

11. The circuit according to claim 9 wherein said second delay means is of a time duration substantially at least as long as that of said first delay means.

* * * * *